United States Patent [19]

Jorgensen et al.

[11] 4,090,275
[45] May 23, 1978

[54] CONVEYOR TRAY SYSTEM FOR ENTRAILS

[76] Inventors: Olaf V. Jorgensen, R.R. No. 1, Kettleby, Ontario; Knud Simonsen, P.O. Box 4, Nobleton, Ontario, both of Canada

[21] Appl. No.: 750,971

[22] Filed: Dec. 15, 1976

[51] Int. Cl.² ............................................. A22C 17/00
[52] U.S. Cl. ............................................ 17/24; 17/11
[58] Field of Search .................... 17/1 R, 11, 24, 21, 17/50, 58; 198/802, 478; 206/558

[56] References Cited

U.S. PATENT DOCUMENTS

| | | | |
|---|---|---|---|
| 2,516,499 | 7/1950 | Albright | 17/11 |
| 2,590,291 | 3/1952 | Albright | 17/24 X |
| 2,738,547 | 3/1956 | Zebarth | 17/11 |
| 2,923,028 | 2/1960 | Lundell | 17/1 R |
| 3,317,949 | 5/1967 | Garcia et al. | 17/24 |
| 3,483,590 | 12/1969 | Balasch et al. | 17/50 |
| 3,601,277 | 8/1971 | Andrews et al. | 206/558 |
| 3,656,681 | 4/1972 | Goings | 206/558 |
| 3,737,949 | 6/1973 | Davis | 17/50 |
| 3,835,502 | 9/1974 | Thompson et al. | 17/21 |
| 4,021,883 | 5/1977 | Schmidt, Jr. | 17/21 |

FOREIGN PATENT DOCUMENTS 1,136,237  9/1962  Germany .............................. 17/1 R Primary Examiner—Louis G. Mancene
Assistant Examiner—Paul J. Hirsch

[57] ABSTRACT

A conveyor tray system for carrying entrails from carcasses on a kill floor and having a plurality of separate trays units, each tray unit being capable of receiving a set of entrails from a carcass moving on a conveyor system, said plurality of trays being carried on a separate continuous closed loop carriage system, and being power operated whereby they move continuously around said carriage system, in synchronism with the movement of the conveyor system for carcasses and wherein said trays are movably mounted on said carriage system whereby they may be moved towards or away from carcasses on the rail, whereby said trays may be positioned for reception of entrails from a carcass at the appropriate position for a particular carcass, and then may be returned to a suitable position for inspection. There is preferably provided means for tipping the trays for acceptance or rejection of their contents respectively, and including a sterilization station where each tray is finally washed and sterilized prior to reception of a further set of entrails.

13 Claims, 13 Drawing Figures

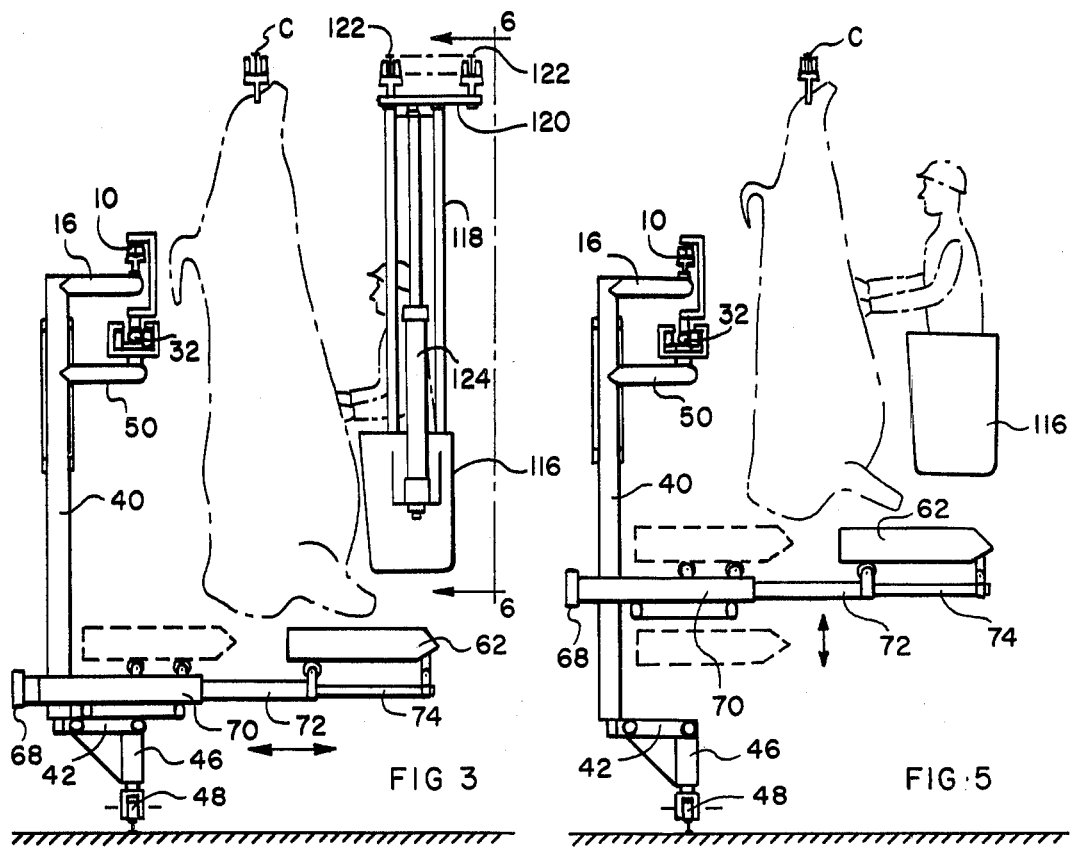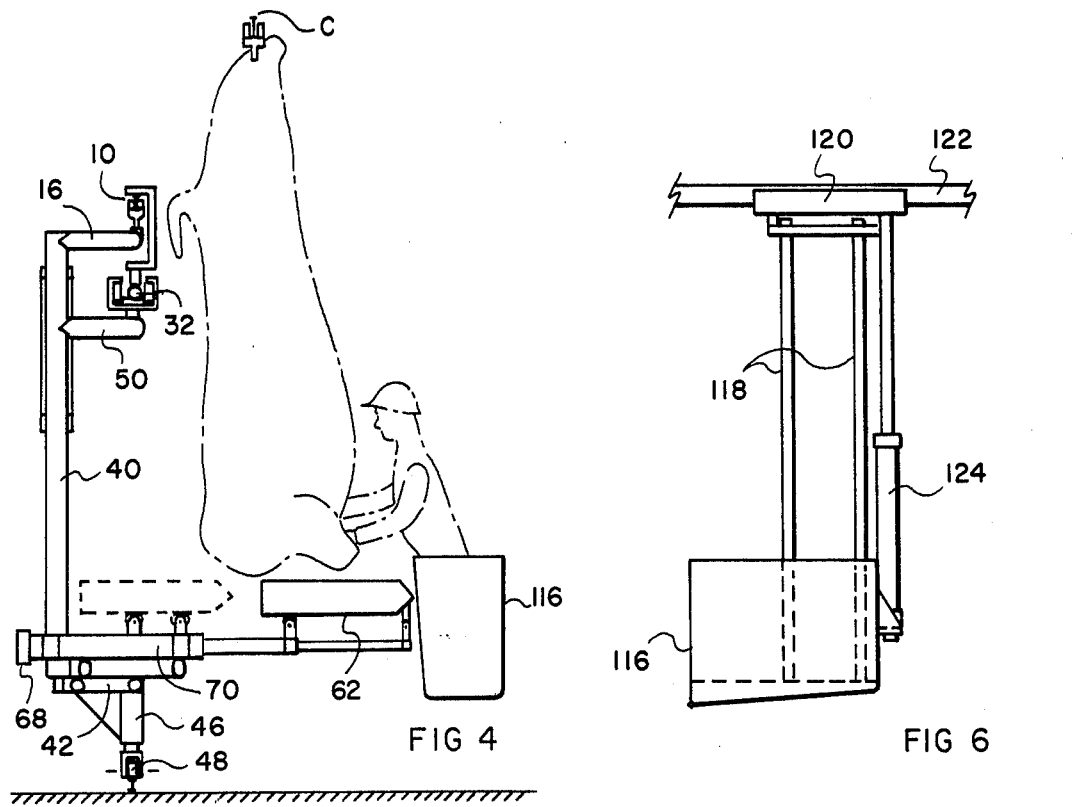

CONVEYOR TRAY SYSTEM FOR ENTRAILS

The present invention relates to a conveyor tray system for use on a kill floor for carrying the entrails of slaughtered animals, for the purposes of examination for contamination and selection for treatment or consumption.

BACKGROUND OF THE INVENTION

Continuously moving conveyor rails are in general use for the processing of slaughtered animals on a kill floor. At various stations along the conveyor rail, the carcass will be subjected to various different operations. At one such location the carcass is opened and the entrails are removed. It is then the standard practice for the entrails to be inspected by an officially appointed inspector who checks the entrails to ensure that they are healthy. Any unhealthy entrails will be condemned as unfit for consumption. He will also check the entrail cavity in the carcass.

In the past, entrail conveyor tables have been provided which moved along a fixed path. Problems occurred in moving the entrails from the carcass to the entrail conveyor. In particular, this involved unpleasant manual tasks, and it is increasingly difficult to find labour willing to carry out such work and it is desirable to reduce or eliminate such manual tasks, as far as possible.

In the past, the inspection task has been carried out on such tables which are located at a fixed height below the carcass. The carcass was suspended by its hind legs at a fixed height on the conveyor rail. The entrails therefore dropped or were manually removed from the carcass onto the table. Depending upon the size of the carcass the entrails will drop either a greater or lesser distance. In some cases, this resulted in rupturing of a portion of the entrails with consequent contamination of the edible portions thereof which must therefore be immediately condemned as unfit for consumption regardless of whether or not they were originally healthy. Furthermore, it is essential that the inspector shall inspect both the entrail cavity in the carcass, as well as the entrails from that carcass. In the past, this has been somewhat difficult and it is by no means uncommon for the inspector to be unable to match one set of entrails with the appropriate carcass, and the consequent confusion has resulted in possible condemnation of otherwise healthy materials, or alternatively the passing of unhealthy material.

Furthermore, the workmen responsible for opening the carcass and removing the entrails must be able to reach up to almost full height of the conveyor, to open a relatively short carcass, or must be able to work at a somewhat lower level to work on a larger carcass. Again, in the past the operator has been required to reach upwardly, or downwardly, depending upon the length of the carcass, and has been standing essentially on a fixed platform while he was working with consequent inconvenience and inefficiency.

In order to meet increasingly severe health standards imposed by governmental and state and provincial regulations, it is desirable that all equipment such as inspection tables and the like shall be continuously sterilized so that the entrails from each new carcass shall be placed on a totally sterile area of a table or conveyor. Again, this has in fact not always been achieved to the highest state of sanitation due to the physical impossibility of separating one set of entrails from the next on a moving table for example.

It is therefore a general objective of the invention to overcome the foregoing disadvantages and to provide a system of conveyor trays for entrails which will receive the entrails without rupturing a portion thereof, and which will enable the inspector to match up each set of entrails with the correct carcass, and which will permit him to accept or reject in a simple and effective manner, and which may be sterilized effectively for each successive usage, and also in which the operator working on the carcass conveyor line can be positioned at the appropriate height for opening the particular carcass in the most efficient manner, and in which handling of the entrails is minimized.

BRIEF SUMMARY OF THE INVENTION

The invention seeks to provide the foregoing advantages and objectives by the provision of a plurality of separate tray units, each tray unit being capable of receiving a set of entrails from a carcass moving on a conveyor system, said plurality of trays being carried on a separate continuous closed loop carriage system, and being power operated whereby they move continuously around said carriage system, in synchronism with the movement of the conveyor system for carcasses, and wherein said trays are movably mounted on said carriage system whereby they may be moved towards or away from carcasses on the rail whereby said trays may be positioned for reception of entrails from a carcass at the appropriate position for a particular carcass, and then may be returned to a suitable position for inspection. There is preferably provided means for tipping the trays for acceptance or rejection of their contents respectively, and including a sterilization station where each tray is finally washed and sterilized prior to reception of a further set of entrails.

More particularly, it is an objective of the invention to provide a system having the foregoing advantages in which the plurality of trays is carried on a carriage system which is in the form essentially of a carousel whereby the trays move around a continuous closed loop path. Such path may be of any suitable shape and will preferably have at least one straight portion adjacent to the carcass conveyor system whereby the trays will be moving in a straight line, at least for a portion of their travel, thereby permitting each tray to register with its appropriate carcass on the carcass conveyor system.

More particularly, it is an objective of the invention to provide a tray system having the foregoing advantages in which each of the trays is carried on telescopic arm support means whereby each tray may be sequentially extended outwardly from the carriage system and returned to it.

More particularly, it is an objective of the invention to provide a tray system having the foregoing advantages including tilting means for tilting each of the trays at predetermined different locations to tip the contents thereof for either acceptance or rejection thereof.

It is a further objective of the invention to provide a tray system having the foregoing advantages in which each tray is mounted on hoist means whereby it may be hoisted upwardly and downwardly relative to the carriage, towards or away from a carcass.

It is a separate objective of the invention to provide an operator support or platform which may move horizontally, in unison with the carcass, and it may also provide for vertical movement of the operator platform, if desired.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 3 is a schematic side elevation showing the first station of the tray system with the operator in a lower position, working on a large carcass;

FIG. 4 is a schematic side elevational view corresponding to FIG. 3, showing the operator in a still lower position, in a final stage of the removal of the entrails from the carcass;

FIG. 5 is a schematic side elevational view corresponding to FIG. 3 showing the operator in a upward position working on a smaller carcass;

FIG. 6 is a rear elevational view showing the support for the operator;

DESCRIPTION OF A SPECIFIC EMBODIMENT

Figure 1:
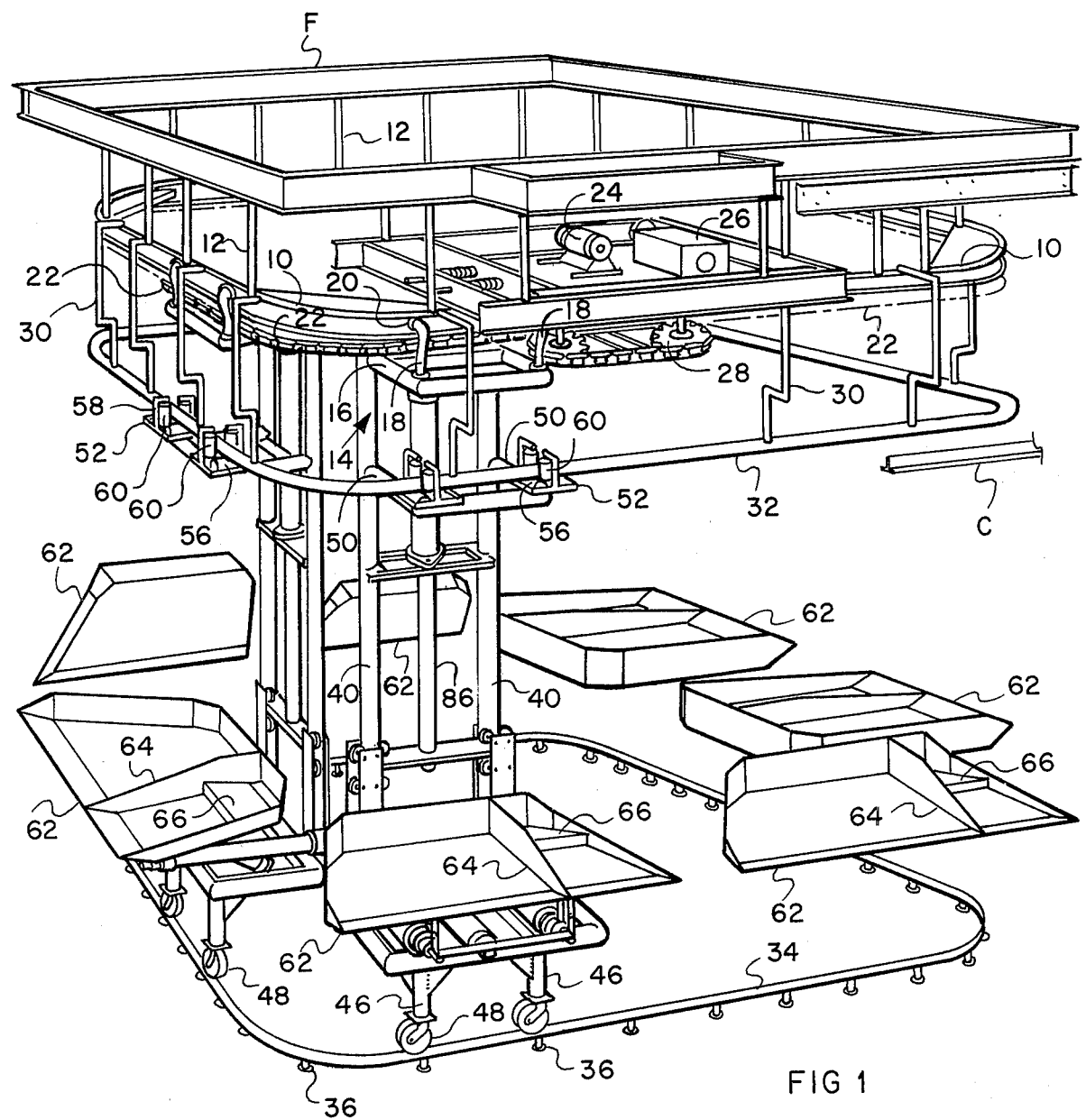
FIG. 1 is an upper perspective illustration showing the moving tray system according to the invention, with some of the trays shown mounted on their carriage mechanisms, and other such trays shown in isolation.
Figure 2:
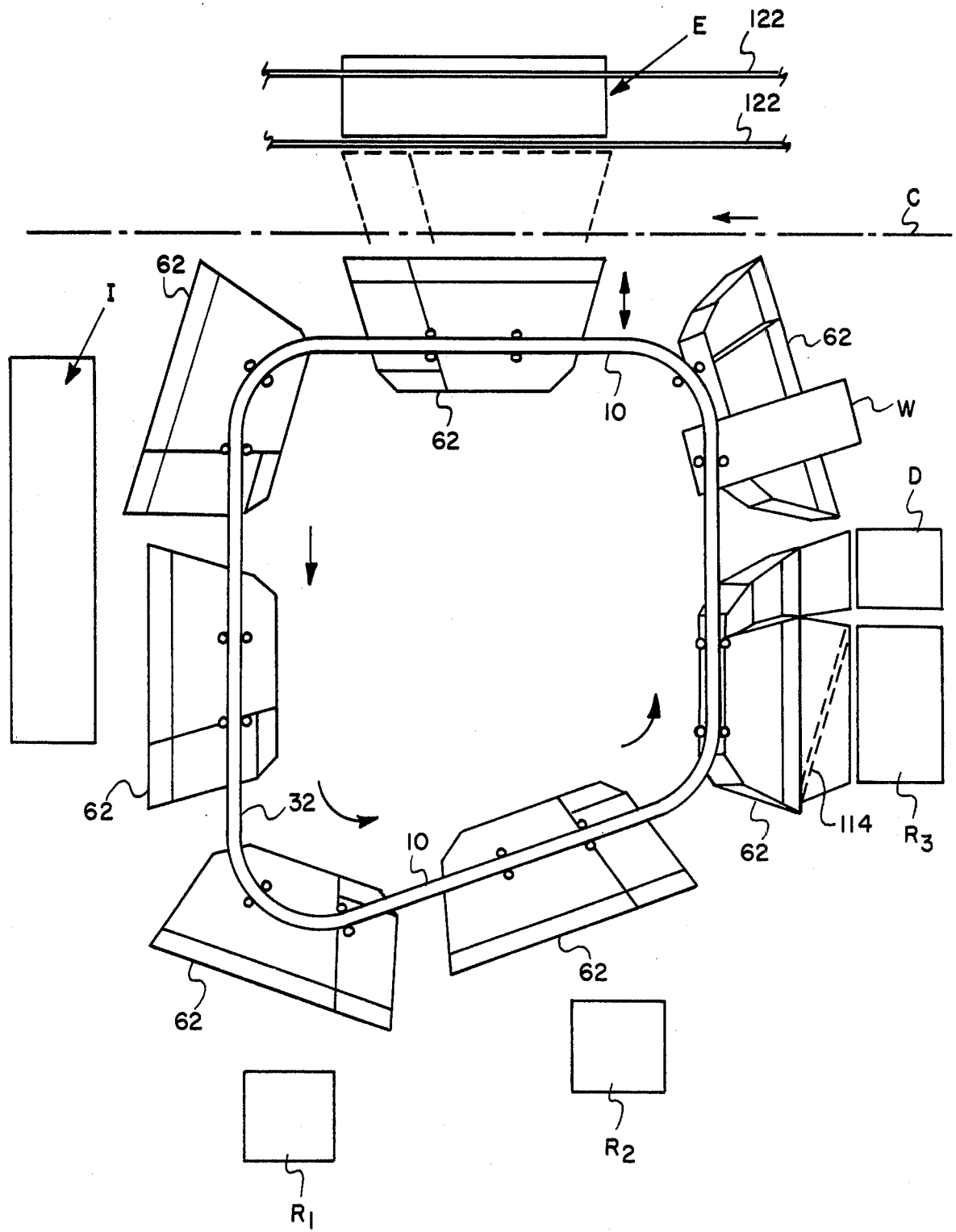
FIG. 2 is a top plan view showing the tray in isolation, in schematic form with the various stations around the path of the carriage system.

Referring now to FIGS. 1 and 2, it will be seen that the apparatus according to the invention is shown in its position in a typical meat packing plant, located along one side of a typical carcass conveyor rail indicated as the letter C. Such conveyor rails are well known in the industry, and are arranged for conveying carcasses continuously throughout the plant, while various different operations are performed at different locations. Various different trolley systems are available (not shown) which are supported on the rail C, and which are arranged, by means such as hooks, chains and the like to support a carcass. It will of course be appreciated therefore, that all of the carcasses will therefore be supported at the same height on the rail C. If carcasses vary significantly in size, the operator will, therefore, have to either reach higher or lower to perform the particular function on that carcass..

As has been mentioned, in the typical meat packing plant, the entrail cavity of the carcass is normally opened just above a table which is located at a fixed height beneath the carcass.

In accordance with the invention, as shown in FIG. 1, an entirely separate conveyor system is provided for the entrails, so that, as soon as the entrails are removed from the carcass, the entrails are then moving on a separate conveyor system, and the carcass can move on. Such a separate conveyor system will be seen to comprise a continuous conveyor rail 10 supported at a predetermined elevation by any suitable means such as the support rods 12. The support rods 12 will be attached to the ceiling structure of the meat packing plant in the typical case. In this particular example, the support rods 12 are shown attached to an over head supporting framework shown generally as F. It will of course be appreciated that the supporting framework F may be of any suitable design depending upon the requirements of the building in which the conveyor system is installed, and is not, therefore, critical to the objects of the invention. As best shown in FIG. 2, the conveyor rail 10 is formed into a closed loop having essentially four relatively straight sections, and four corners, arranged in a somewhat irregular manner, the purposes of which will become apparent from the following description. Again, however, the particular arrangement of the paths of the support rail 10 is not critical to the invention, but merely illustrates one method. The path could be any other shape.

Supported on the rail 10 are a plurality of trolley systems indicated generally as 14. In the particular example of the invention as illustrated, there are seven separate such trolley systems, but the number may vary depending on the design of the entire meat packing plant.

The trolley systems 14 each comprise a generally rectangular tubular trolley frame 16, and four upwardly extending arms 18 extending in pairs on opposite sides of the rail 10. On the upper ends of the arms 18 there are provided trolley wheels or rollers 20 which engage the rail 10 and by means of which the trolley frame 14 may run around the rail 10 in the manner described below.

In order to move all of the trolleys 14 continuously around the rail 10, there is provided a conveyor chain system 22, typically of a known design, which extends continuously around the path of the rail 10, and engages the trolleys 14 in the manner shown.

The chain 22 is driven by any suitable motor drive means such as the motor 24, reduction gear 26 and drive sprocket 28. Preferably, the motor and drive sprocket will be operated at a speed appropriate to move the chain 22 at the same speed as the trolleys (not shown) on the conveyor rail C.

By means of the motor drive system and chain 22, the trolleys 14 are thus moved continuously around the rail 10 in a closed loop path.

Attached to the upper edge of the conveyor rail 10, and extending downwardly therefrom are a plurality of fixed support arms 30 located at spaced intervals entirely around the rail 10. Attached to the lower ends of the support arms 30, is a continuous guide rail 32, the purpose of which will be described below. The rail 32 describes essentially the same shape of pathway as that described by the conveyor rail 10.

Located more or less directly beneath the conveyor rail 10, but fastened to the floor of the building, there is provided a further guide rail 34, mounted on a series of upstanding legs 36, the purpose of which will be described below. Again, the guide rail 34 describes essentially the same path as that described by the guide rail 10.

Extending downwardly from each trolley 14, on the upper conveyor rail 10, there are provided two vertical post members 40. The post members 40, at their lower ends, are attached to a lower trolley comprising horizontal arms 42 and cross-member 44. Downwardly dependent leg members 46 are attached to arms 42 and have trolley wheels 48 which run on the lower guide rail 34.

In this way, the movement of the upper trolley 14, caused by the chain drive system, is communicated through the vertical posts to the lower trolley which is thereby moved around the lower guide rail together with the upper trolley, as a single unit.

In order to provide still further guidance and control for the movement of the two trolley units and post members as described, a pair of generally horizontal control arms 50 extend outwardly from respective post members 40 and support two further guide trolleys 52. Each guide trolley 52 supports horizontal guide rollers 56, and has a pair of upstanding support rods 58 carrying vertically oriented guide rollers 60. The rollers 60 and 56 together engage the guide rail 32 so as to control the movement of the trolley units and post members around their predetermined path.

In order to catch and support the entrail from a carcass, the trays 62 are provided movably mounted on post members 40, there being one tray to each such pair of post members. Preferably, the trays 62 will have at least one dividing wall 64 dividing the tray into a large and a small portion, and the smaller portion will preferably have a raised floor portion 66 which effectively divides the tray into three compartments.

In this way, the various portions of the entrails from the carcass may be suitably arranged on the tray so as to facilitate inspection.

The trays will of course be made of stainless steel so as to facilitate washing, and will be washed and sterilized each time they are used, in a manner to be described below. The trays are supported on movable mounting means, to be described below, such that they may be moved towards or away from a carcass on the rail C. This movement will usually be a straightforward up or down vertical movement, to adjust to the size of the carcass. It may also however envisage a horizontal outward and inward movement if desired.

These various functions are achieved in the following manner.

Assuming a horizontal movement capability is required, then each of the trays is mounted on a pair of three part telescoping cantilever arm members indicated generally as 68. Each of the cantilever arm members comprises an outer sleeve portion 70, an intermediate sleeve portion 72 and an inner arm portion 74. The inner arm portion is slidably mounted within the intermediate arm sleeve portion and the intermediate sleeve portion is slidably mounted within the outer sleeve portion. Such slidable mounting may be achieved by any suitable anti-friction means such as plastic sleeves 76, formed for example of TEFLON (Trade Mark) or any other suitable plastic material having a low degree of friction, or in the alternative, some other form of anti-friction bearing means may be used. Similarly, the use of a sleeve type telescopic construction is merely illustrative. Other forms of extendable cantilever mechanism may be employed such as rails, channels or the like as is well-known for example in the construction of hoisting mechanisms and the like.

In order for the trays to move upwardly and downwardly the outer sleeve portion 70 is rigidly mounted on vertically movable trolley members 78 consisting of a pair of plate members 80, and rollers 82 rotatably mounted therebetween. The rollers 82 engage the post members 40, and are slidably movable upwardly and downwardly.

In order to hoist the two trolleys 78 upwardly and downwardly, the two trolleys are inter-connected by a connecting bar 84, which is in turn connected to the operating rod 86 of a pneumatic cylinder 88. Clearly, some other form of power operated means may be provided, the cylinder 88 being merely exemplary.

The cylinder 88 is mounted, by any suitable means such as the mounting brackets 90 on the post members 40. In order to provide further support for the outer sleeves 70 of the cantilever arms 68, a rectangular supporting frame 92 is fastened to the lower ends of the plates 80 as shown, and is also attached to the cantilever arms 68 in any suitable manner at the outer ends thereof.

Where outward and inward movement is not required, then the arm members 68 could be replaced by fixed supporting means (e.g. frame 92) of suitable length fastened in any suitable manner, for example, to the trolleys 78.

Figure 8:
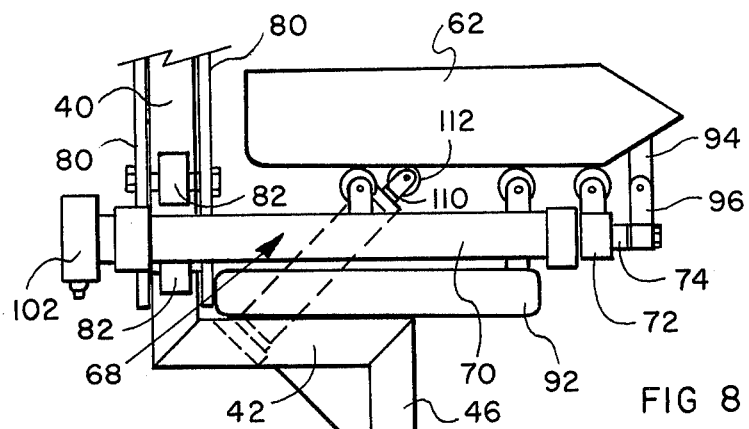
FIG. 8 is a side elevational view showing the tray and a portion of its carriage.
Figure 9:
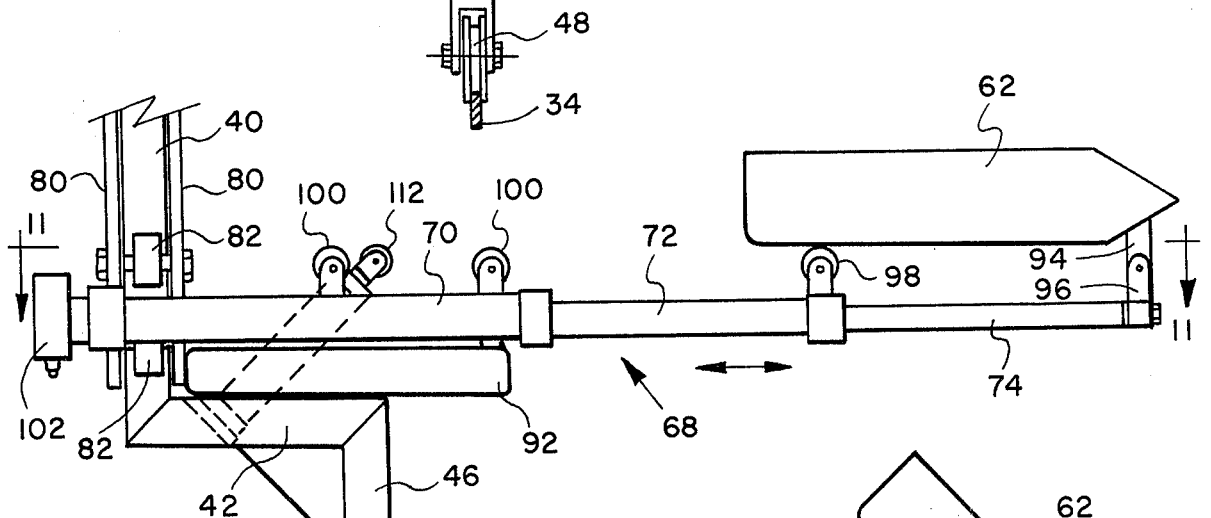
FIG. 9 is a side elevational view corresponding to FIG. 8, showing the tray in an extended position.
Figure 10:
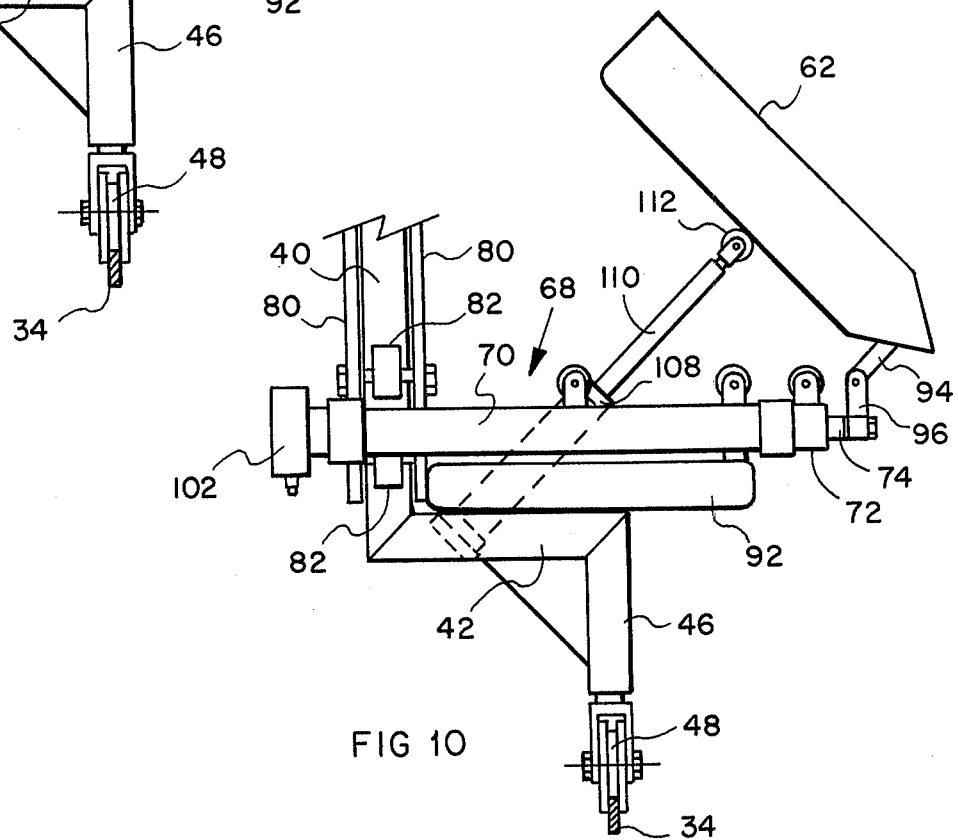
FIG. 10 is a side elevational view correponding to FIGS. 8 and 9 showing a tray in its tilted position.

As best shown in FIGS. 8, 9 and 10, the tray 62 is supported at its outer end by means of a flange 94 pivotally connected to a flange 96 extending upwardly from the inner arms 74. The weight of the tray 62, rearwardly of the flange 94 is supported on a series of rollers. The outer-most roller 98 is mounted on the outer end of the intermediate sleeve 72, and two further rollers 100 are mounted on the outer sleeve 70. In this way, the tray 62 may be extended and retracted, while its weight is supported by the rollers.

Figure 7:
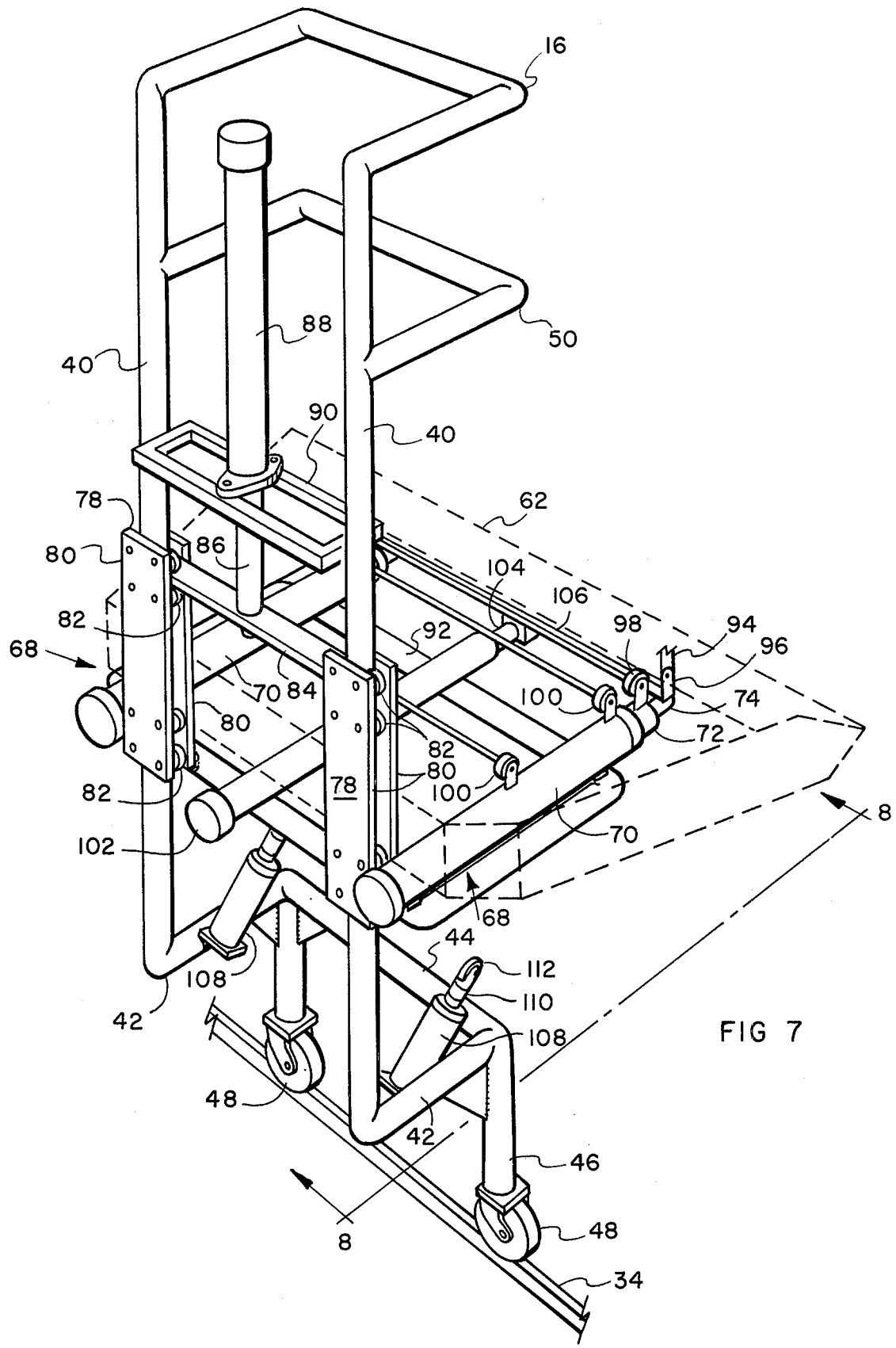
FIG. 7 is a rear upper perspective illustration showing the carriage for a particular tray.
Figure 11:
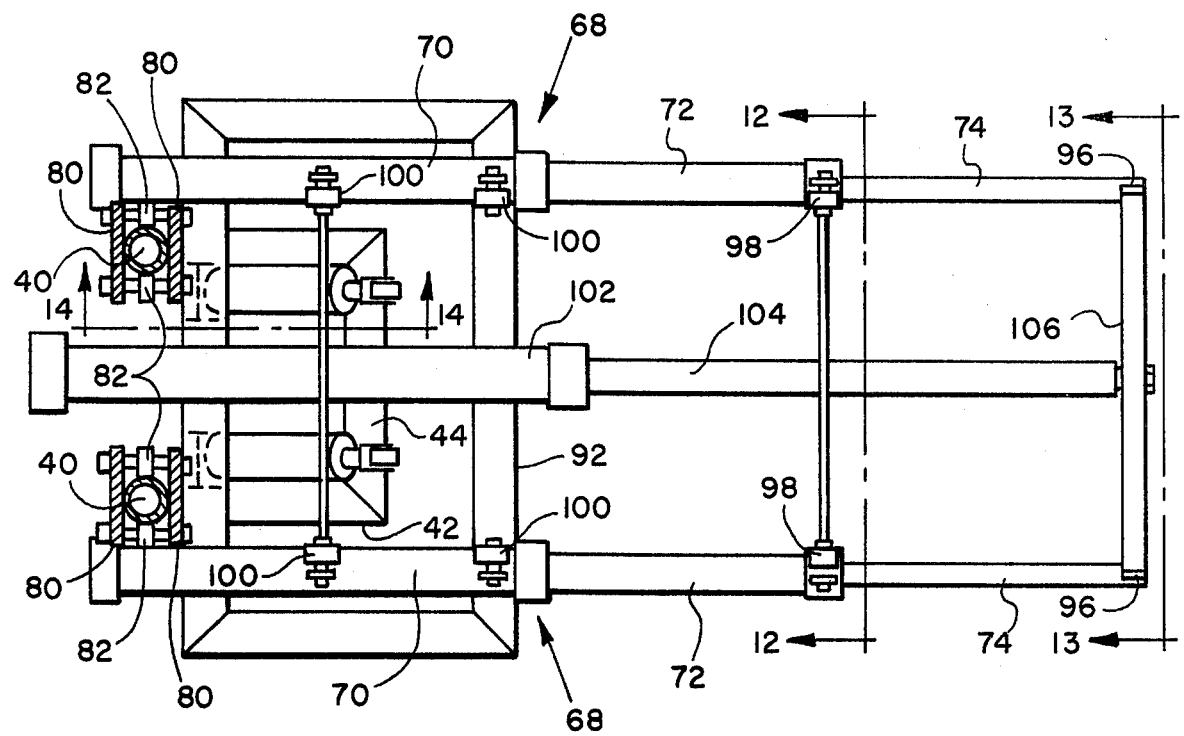
FIG. 11 is a top plan view of the carriage for a tray, with the tray itself being omitted for the sake of clarity.
Figure 12:
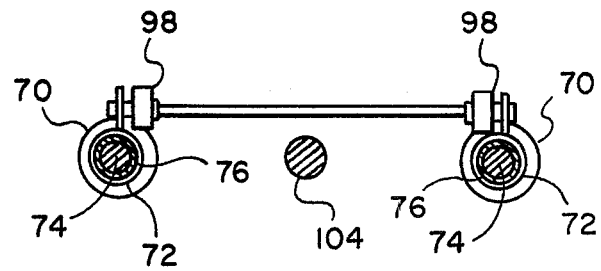
FIG. 12 is a sectional front elevation along the line 12—12 of FIG. 11.

Extension and retraction of the tray 62 is achieved, as shown in FIG. 7 and FIG. 11 by power means such as pneumatic cylinder 102, the connecting rod 104 of which is connected to a cross-member 106 extending between the inner arm portions 74 at their outer ends.

Any suitable control mechanism (not shown) for operating the cylinder 102 may be provided in a manner well known in the art.

It will of course be appreciated that any other power operated means may be provided, and the use of pneumatic cylinders while being a convenient form of such a power system, is merely exemplary.

Figure 14:
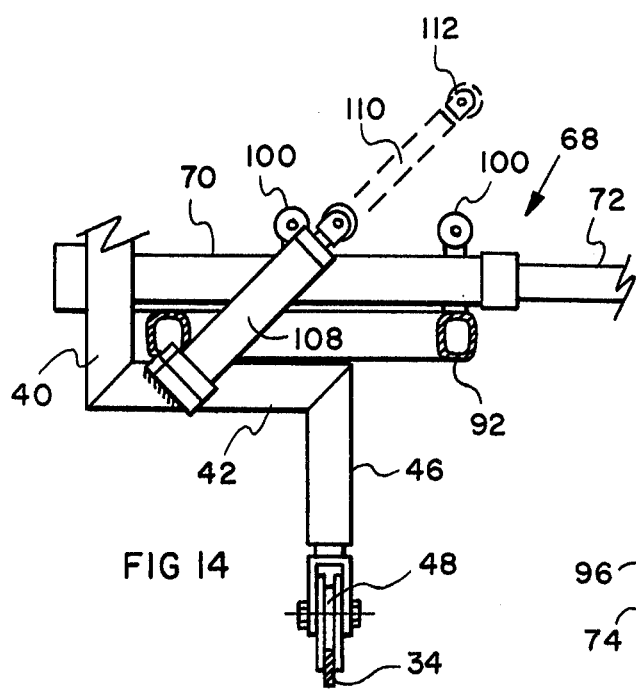
FIG. 14 is a side elevational view of a detail of FIG. 8 showing an extended position of the tilting mechanism.
Figure 13:
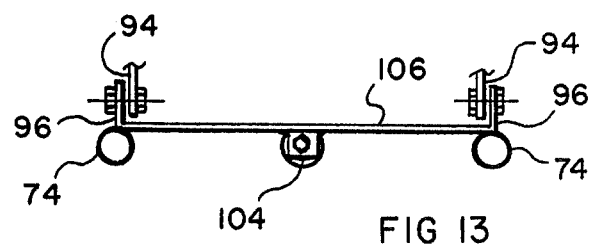
FIG. 13 is a front elevation along the line 13—13 of FIG. 11.

In order to tilt the tray as shown in FIG. 10, to dump the contents, power means such as pneumatic cylinders 108 are mounted on respective horizontal arms 42 (see FIG. 14) having connecting rods 110 which are provided with rollers 112 at their free ends. The rollers engage the underside of the tray 62 in the manner shown in FIG. 10, and, when the cylinders 108 are operated the connecting rods 110 will be extended thereby pushing the trays into the positions as shown.

When the cylinders 108 are retracted, the tray 62 will swing downwardly under the influence of gravity.

It will, of course, be appreciated that the use of pneumatic cylinders is not the only way in which this function could be carried out, and is merely exemplary of one suitable power operated means for the purpose. Other power systems could of course be used without departing from the scope of the invention.

Referring now to FIG. 2, it will be appreciated that the trays 62 are moved around a continuous closed loop path which is essentially rectangular on three sides and angled on the fourth side as shown. Around this continuous closed path, there are various different work stations or operating stations where different functions are carried out.

Three stations are shown in FIG. 2 as follows.

The eviscerating station is shown as E, being at a location between the closed loop rail 10 and a continuous carcass conveyor C. At this station, the carcasses are opened and eviscerated, and the entrails or viscera placed in the trays 62.

The inspection station is shown as I. At this station, the government appointed inspector will carefully examine the viscera located on the trays 62 as they pass in front of him.

Any portion of the viscera which is to be condemned as unfit, and subsequently disposed of will be suitably marked by the inspector. Similarly, when he has completed his inspection of the viscera, he can simply move to his left, and inspect the appropriate carcass moving along the conveyor rail C, the carcass is moving from right to left with respect to FIG. 2 in the direction of the arrow along the line C as shown.

From the inspection station, the trays pass around three separate removal stations $R_1$, $R_2$ and $R_3$. Stations $R_1$ and $R_2$ will be used for the removal of different portions of the "pluck". They are shown merely shown in schematic form. In fact, the separate items comprising the liver, kidneys, heart, lungs, etc., will be removed and recovered separately, being subjected to appropriate washing steps, cooling steps and the like as is well-known in the art. Separate conveyor rails may be provided for conveying different portions of the pluck to appropriate refrigeration rooms for rapid cooling, as is well-known in the art.

The removal station $R_3$ is shown as somewhat larger than $R_1$ and $R_2$. At this station, the paunch of the viscera will be removed.

The disposal station is shown as D. At this station any portions of the viscera which are condemned will be disposed of.

By means of a suitable diverting chute 114, incorporated in the removal station $R_3$, the paunch, if condemned, may be diverted into the disposal station D.

After the trays 62 have thus been emptied, they are washed prior to reuse. This is achieved at the washing station W. This is not shown in detail, but will essentially consist of a system of high pressure water sprays spraying hot water preferably containing any suitable detergent or disinfectant fluid directly onto the surfaces of the trays 62. Preferably, the water sprays would be angled so as to provide a sweeping action so as to sweep any particles off the tray and leave the tray 62 free of contamination.

It will, of course, be appreciated that the trays 62 while passing through the washing station W is still elevated at an angle by means of the cylinders 108, and the water will simply drain directly off into any suitable receptacle (not shown). Drying means may also be provided if desired.

Once washed, each tray 62 will then be returned to the horizontal position, by the retraction of the cylinders 108, and is then ready for use once more.

If desired, in order to provide for a more automated high speed system, the actual operator who opens the carcasses on the rail C, and eviscerates the carcasses onto the trays 62, may be mounted on a movable platform as shown in FIGS. 3, 4 and 5.

Such a platform will be seen to consist of a small bucket-shaped platform 116.

The platform 116 is preferably mounted on a pair of guide posts 118 suspended from a trolley 120. The trolley 120 runs on a pair of relatively short parallel support rails 122. Typically, the rails 122 may be about six or eight feet long.

The trolley 120 may be moved along the support rails 122 at a rate comparable to the rate of movement of the carcass along the conveyor rail C. This may be achieved, for example, by a synchronized electric motor or any other suitable power means (not shown). Preferably, the operation of such trolley will be timed so that it may be returned or reciprocated along the rails 122 in time to align the operator and the platform 116 with the next carcass.

If desired, in order to permit the operator to reach either a shorter or a longer carcass, the platform 116 may be raised upwardly and downwardly on the support post 118 by any suitable power operated means such as the pneumatic cylinder 124.

In operation, the operator will be in the position as shown in FIG. 3, for a large carcass. The carcass will be moving slowly and the operators platform 116 will also be timed to commence movement at the same speed so as to keep the operator facing the carcass while he is working on it. The trays will be at their lowest positions.

By any suitable automatic timing mechanism, (not shown), the tray 62 will have been raised upwardly, towards the neck of the carcass. The tray 62 will thus be positioned essentially directly beneath the carcass to be opened.

The operator will then open the entrail cavity and remove the paunch which will fall downwardly into the tray 62.

The operaatory by means of the cylinder 124 may lower the platform 116 so as to have access to the "pluck" of the carcass. He will remove the various portions of the pluck and place them by hand in the appropriate spaces in the tray 62 as shown schematically in FIG. 4.

Cylinder 88 is operated to lower tray 62 to its lowermost position.

Throughout this operation, the carcass on the rail C, and tray 62, and the platform 116 are all moving simultaneously from right to left with respect to FIG. 2, until the operators work is completed.

The platform 116 will then move in the reverse direction so as to place the operator in position to work on the next carcass.

Once deposited on the tray 62, the entrails will then be carried on the tray from one station to another around the track of the rail in the manner described above.

An inspector will be standing somewhere at about station I, and will inspect the entrails. At the same time he can inspect the cavity in the carcass from which they were removed. He will usually make some appropriate notation on the entrails and carcass.

At stations $R_1$ and $R_2$ certain edible portions of the entrails or viscera are removed and placed in suitable bins or chutes (not shown), leaving the paunch in the tray 62. When the tray 62 reaches the work stations $R_3$ and D, the cylinders 108 are operated so as to tip the tray 102. If the paunch is to be accepted as fit, then it will be deposited in the receiving station R₃. If, however, it is to be rejected, then an operator will position the baffle 114 so as to divert it to the disposal chute D.

While still in its tilted position, the tray 62 will then pass through the water spray unit W (and dryers if provided). The cylinder 108 are then retracted permitting the tray to swing downwardly into its horizontal position, and it is then ready to receive the viscera from another carcass. Where the next carcass is under size, then the operator can by any suitable controls (not shown) be moved so as to elevate the platform 116 to the most suitable height.

The tray is moved upwardly, since the carcass is somewhat smaller since it will be desirable to have the tray 62 somewhat higher so as to receive the paunch without damage.

Preferably, the raising and lowering of tray 62 will be automatic. The tray 62 will normally be in its lowermost position as shown in FIG. 3, and then will be elevated by cylinder 88 until the tray 62 touches the lowermost portion of the carcass.

Operation of cylinder 88 is preferably automatic and a suitable pressure sensitive device (not shown) responds to contact between tray 62 and the carcass so as to shut off the cylinder 88 at that point.

Similarly, automatic controls will operate the cylinder 88 so as to lower the tray 62 to its lowermost position, once the tray 62 has been retracted.

Where horizontal outward and inward movement is incorporated in the apparatus then the extension and retraction of the trays will also preferably take place automatically by operation of cylinders 102 by suitable controls (not shown).

It will of course be appreciated that in many cases, horizontal movement of the trays, and possibly of the operator, will not be necessary, and the equipment for this function can therefore be omitted altogether.

Each tray will then simply move horizontally out and in, and the platform 116 will remain at the same height at all times. If desired some form of manual height adjustment could be provided for the platform so that it can be preset to the most suitable working height for a particular operator, or batch of carcasses.

The foregoing is a description of a preferred embodiment of the invention which is given here by way of example only. The invention is not to be taken as limited to any of the specific features as described but comprehends all such variations thereof as come within the scope of the appended claims.

What is claimed is:

1. An entrail conveyor system for use on a kill floor having carcass rail means for carrying carcasses thereacross, said entrail conveyor system comprising;
    working platform means of adjacent to one side of said carcass rail means;
    entrail tray means;
    conveyor means for moving said tray means along a predetermined path, on the opposite side of said carcass rail means, and,
    power operated movable support means for carrying said tray means on said conveyor means and operable for extending said tray means away from said conveyor means towards said working platform means, and for retracting said tray means away from said working platform means back to said conveyor means.

2. The entrail conveyor system as claimed in claim 1 including hoist means connected with said tray means for raising and lowering the same relative to said conveyor means.

3. An entrail conveyor system as claimed in claim 1 wherein said conveyor means comprises a closed loop continuous conveyor, carrying said tray means around a continuous closed loop path, a portion of said closed loop path being adapted to be located along side a portion of said carcass rail means whereby, for a portion of said path, said tray means, and carcasses on said rail means move along essentially parallel adjacent paths, said tray means being thereafter moved away from said carcass rail means and returning thereto around the remainder of said path.

4. An entrail conveyor system as claimed in claim 3 including a plurality of treatment stations around said closed loop path, located away from said carcass rail means, for subjecting entrails carried on said tray means to a plurality of different treatments.

5. An entrail conveyor system as claimed in claim 4 including tray washing means adjacent to said closed loop path of said conveyor means, said tray means being passed successively through said tray washing means.

6. An entrail conveyor system as claimed in claim 1 wherein said conveyor means includes a plurality of upright support members, each of said support members being linked together whereby they move along said predetermined path in unison.

7. An entrail conveyor system as claimed in claim 6 wherein said tray support means are attached to said upright support members, said tray means being mounted on said tray support means, said tray support means being operable to be extended away from said upright support members, and to be retracted thereto whereby to move said tray means towards or away from carcasses on said carcass rail means.

8. An entrail conveyor system as claimed in claim 7 wherein said tray means are movably mounted on said movable support means, and incuding power operated tilting means for tilting said tray means relative to said support means.

9. An entrail conveyor system as claimed in claim 6 including trolley means movably mounted on said upright support members, and movable vertically upwardly and downwardly, and wherein said tray means are mounted on said trolley means, whereby said tray means may be moved upwardly and downwardly relative to said carcasses.

10. An entrail conveyor system as claimed in claim 3 including movable working platform means for supporting an operator adjacent said carcasses on said rail means, and, reciprocal platform carriage means for moving said working platform to and fro along a horizontal reciprocal path adjacent said carcasses, whereby said operator may move in unison with a carcass moving along said rail means while working thereon and may return along the same path, in the opposite direction to carcasses moving on said rail, independently of movement of said tray means.

11. An entrail conveyor system as claimed in claim 10 wherein said working platform means is also movable upwardly and downwardly independently of said tray means whereby an operator may be placed at the most suitable working height for a particular carcass.

12. An entrail conveyor system as claimed in claim 1 wherein said movable support means are operable to move said tray means upwardly and downwardly towards and away from said carcasses independently of said platform means.

13. An entrail conveyor system as claimed in claim 1 wherein said movable support means are operable to move said tray means outwardly and inwardly towards and away from said carcasses independently of said platform means.

* * * * *